(12) United States Patent
Abusleme et al.

(10) Patent No.: US 12,709,652 B2
(45) Date of Patent: Aug. 18, 2026

(54) VINYLIDENE FLUORIDE POLYMER POLYMERIZATION

(71) Applicant: SYENSQO SPECIALTY POLYMERS ITALY S.p.A, Bollate (IT)

(72) Inventors: Julio A. Abusleme, Saronno (IT); Anne-Charlotte Le Gulluche, Milan (IT)

(73) Assignee: SYENSQO SPECIALTY POLYMERS ITALY S.p.A., Bollate (IT)

( * ) Notice: Subject to any disclaimer, the term of this patent is extended or adjusted under 35 U.S.C. 154(b) by 660 days.

(21) Appl. No.: 18/246,316

(22) PCT Filed: Sep. 14, 2021

(86) PCT No.: PCT/EP2021/075178
§ 371 (c)(1),
(2) Date: Mar. 22, 2023

(87) PCT Pub. No.: WO2022/063630
PCT Pub. Date: Mar. 31, 2022

(65) Prior Publication Data

US 2023/0391901 A1 Dec. 7, 2023

(30) Foreign Application Priority Data

Sep. 23, 2020 (EP) .................................... 20197702

(51) Int. Cl.

| | |
|---|---|
| ***C08F 14/22*** | (2006.01) |
| ***C08J 5/18*** | (2006.01) |
| ***C08L 27/16*** | (2006.01) |

(52) U.S. Cl.
CPC ................ *C08F 14/22* (2013.01); *C08J 5/18* (2013.01); *C08L 27/16* (2013.01); *C08J 2327/16* (2013.01); *C08J 2401/28* (2013.01); *C08J 2429/04* (2013.01); *C08L 2205/025* (2013.01); *C08L 2205/03* (2013.01)

(58) Field of Classification Search
None
See application file for complete search history.

(56) References Cited

U.S. PATENT DOCUMENTS

2002/0198334 A1* 12/2002 Kaspar ...................... C08F 2/22 526/78

FOREIGN PATENT DOCUMENTS

| | | | | |
|---|---|---|---|---|
| CN | 106336476 A * | 1/2017 | ............ | C08F 214/22 |
| WO | 2014071144 A1 | 5/2014 | | |
| WO | 2016041808 A1 | 3/2016 | | |
| WO | 2018114753 A1 | 6/2018 | | |

OTHER PUBLICATIONS

International Search Report issued in International Application No. PCT/EP2021/075178 dated Dec. 6, 2021 (3 pages).
Written Opinion issued in International Application No. PCT/EP2021/075178 dated Dec. 6, 2021 (6 pages).

* cited by examiner

*Primary Examiner* — Richard A. Huhn
(74) *Attorney, Agent, or Firm* — Osha Bergman Watanabe & Burton LLP

(57) ABSTRACT

The present invention pertains to a vinylidene fluoride polymer, to a process for manufacturing said vinylidene fluoride polymer and to an article comprising said vinylidene fluoride polymer.

16 Claims, 2 Drawing Sheets

VINYLIDENE FLUORIDE POLYMER POLYMERIZATION

TECHNICAL FIELD

This application is a national stage entry of PCT/EP2021/075178, filed on Sep. 14, 2021, which claims priority to European Patent application N. 20197702.2 filed on Sep. 23, 2020, the whole content of this application being incorporated herein by reference for all purposes.

The present invention pertains to a vinylidene fluoride polymer, to a process for manufacturing said vinylidene fluoride polymer and to an article comprising said vinylidene fluoride polymer.

BACKGROUND ART

Vinylidene fluoride polymers are advantageously used in several different applications.

Poly(vinylidene fluoride) (PVDF) is obtainable via polymerization of vinylidene difluoride monomers (difluoro 1,1-ethylene, VF2 or VDF), either by suspension polymerization or by emulsion polymerization.

The main advantage of the suspension polymerization of VDF in comparison with emulsion polymerization is that it is possible carrying out the process in the absence of surfactant, in particular in the absence of fluorinated surfactants.

However, during suspension polymerization of VDF in the absence of any suspending agent, reactor fouling (that is build-up of polymer deposits on the inner surfaces of the reactor and of the stirring equipment) is observed, which prevents the scaling of the process to industrial production.

The use of non-ionic suspending agents in VDF suspension polymerization is known in the art. As an example, WO 2016/041808 discloses reducing fouling in VDF polymerizations by using a mixture of non-ionic surfactants comprising an alkylene oxide polymer (PAO) and a non-ionic hydroxyalkyl cellulose.

However, non-ionic suspending agents may not be effectively removed in the purification step of the polymer which is a step needed in order to obtain a VDF polymer of good quality to be suitably used in several applications.

Said purification step includes washing the polymer particles with pure water. It follows that the higher solubility of the suspending agent in water, the greater purification efficiency is obtained and then a purer PVDF polymer.

Among suspending agents, the ionic ones have the highest water solubility. However, the use of ionic suspending agents in VDF suspension polymerization may result in unstable reactions, with the control of the reaction that may be not enough efficient to provide a safe scale-up the production to industrial level.

There is thus still the need in the art for a process of manufacturing a vinylidene fluoride polymer that leads to a purer PVDF and feasible on industrial scale.

SUMMARY OF INVENTION

It has been now surprisingly found that the process of the present invention advantageously enables easily obtaining vinylidene fluoride polymers by a method that allows avoiding fouling of the reactor while, at the same time, makes use of a certain blend of suspending agents that are easily washed out from the polymer at the end of the polymerization.

In a first aspect, the present invention pertains to a process for manufacturing a vinylidene fluoride polymer [polymer (VDF)] in aqueous suspension, said process comprising polymerizing vinylidene fluoride in the presence of:

A) at least a non-ionic suspending agent; and

B) at least an ionic carboxyalkyl cellulose.

The inventors surprisingly found that by using a mixture of at least an ionic suspending agent and at least a non-ionic suspending agent, it is possible to substantially reduce the amount of non-ionic suspending agent while a controllable polymerization can be carried out, without fouling.

In a second aspect, the present invention thus pertains to a vinylidene fluoride polymer [polymer (VDF)] obtainable by the process of the invention.

Also, it has been surprisingly found that the vinylidene fluoride polymer powder obtained by the process of the present invention is characterized by bead-shaped, substantially round particles having a size distribution with a D50 value higher than 150 microns and advantageously exhibits outstanding flowability.

In a third aspect, the present invention pertains to a composition [composition (C)] comprising at least one polymer (VDF) of the invention.

In a fourth aspect, the present invention pertains to an article comprising the composition (C) of the invention.

DESCRIPTION OF EMBODIMENTS

Figure 1:
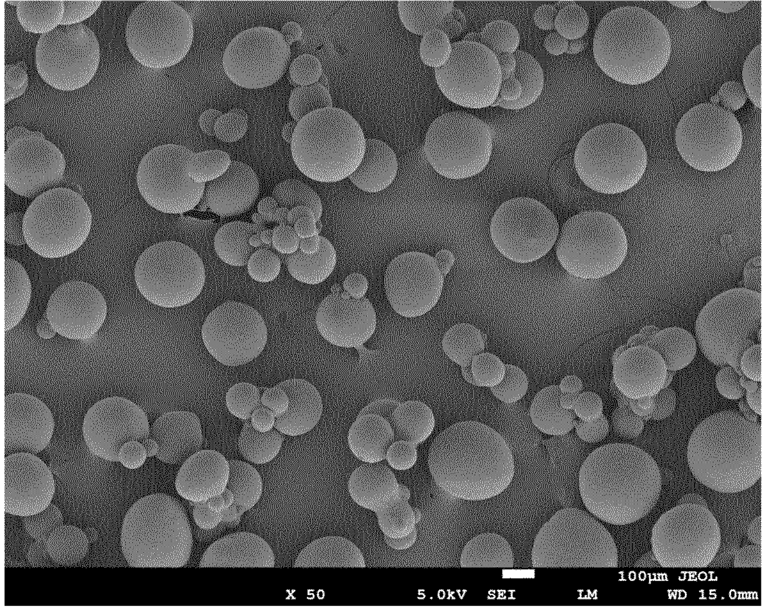
FIG. 1 shows the SEM image of the particles of polymer (VDF) or Example 1 at a magnification of 50×.

Unless otherwise specified, in the context of the present invention, all percentages are relative to the ratio of the weight of a specific component of a mixture divided by the total weight of the mixture (indicated as wt/wt).

The term "substantially round" and related forms, as used herein, refers to particles that have a substantially round appearance in both sectional planes and do not have an elongated body.

As used herewith, the term "vinylidene fluoride polymer" indicates a polymer comprising more than 50% moles, preferably more than 80% moles, of recurring units derived from the polymerization of vinylidene fluoride monomer (difluoro 1,1-ethylene, VF2 or VDF).

For the purpose of the present invention, the vinylidene fluoride polymer is preferably a homopolymer comprising recurring units derived from VDF only.

For the purpose of the present invention, the vinylidene fluoride polymer may optionally comprise, in addition to the VDF monomer, recurring units different from VDF recurring units, and which are derived from the polymerization of ethylenically unsaturated monomers different from VDF (for example 0.1-20 mol %, preferably from 0.5 to 10 mol %, with respect to the total number of moles of the composition). Said ethylenically unsaturated monomers may comprise at least one fluorine atom and can be hence designated as fluorinated comonomers. Still, the ethylenically unsaturated monomers can be free from fluorine atoms; examples of these non-fluorinated comonomers are notably hydrophilic (meth)acrylic monomers.

The hydrophilic (meth)acrylic monomer (MA) preferably complies to formula:

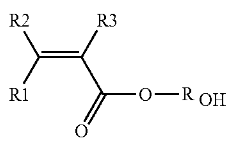

wherein each of R1, R2, R3, equal or different from each other, is independently a hydrogen atom or a $C_1$-$C_3$ hydrocarbon group, and $R_{OH}$ is a hydrogen or a $C_1$-$C_5$ hydrocarbon moiety comprising at least one hydroxyl group. Non limitative examples of hydrophilic (meth) acrylic monomers (MA) are notably acrylic acid, methacrylic acid, hydroxyethyl (meth)acrylate, hydroxypropyl(meth)acrylate; hydroxyethylhexyl (meth)acrylates.

The monomer (MA) is more preferably selected from:

hydroxyethylacrylate (HEA) of formula:

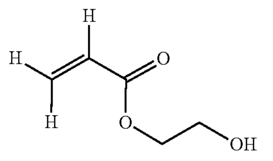

2-hydroxypropyl acrylate (HPA) of either of formulae:

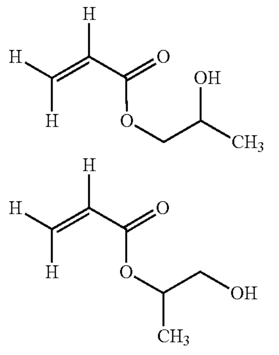

acrylic acid (AA) of formula:

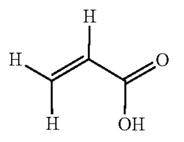

and mixtures thereof.

Most preferably, the monomer (MA) is AA and/or HEA.

Non-limiting examples of fluorinated comonomers different from VDF, as above detailed, comprise, notably, the following:

(i) $C_2$-$C_8$ fluoroolefins such as trifluoroethylene (TrFE), tetrafluoroethylene (TFE) and hexafluoropropylene (HFP);

(ii) perfluoroalkylethylenes of formula $CH_2{=}CH{-}R_{f0}$, wherein $R_{f0}$ is a $C_2$-$C_6$ perfluoroalkyl group;

(iii) chloro- and/or bromo- and/or iodo-$C_2$-$C_6$ fluoroolefins such as chlorotrifluoroethylene (CTFE);

(iv) perfluoroalkylvinylethers of formula $CF_2{=}CFOR_{f1}$, wherein $R_{f1}$ is a $C_1$-$C_6$ perfluoroalkyl group, such as perfluoromethylvinylether (PMVE) and perfluoropropylvinylether (PPVE);

(v) (per)fluorooxyalkylvinylethers of formula $CF_2{=}CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;

(vi) (per)fluoroalkylvinylethers of formula $CF_2{=}CFOCF_2OR_{f2}$, wherein $R_{f2}$ is a $C_1$-$C_6$ (per)fluoroalkyl group, e.g. $-CF_3$, $-C_2F_5$, $-C_3F_7$, or a $C_1$-$C_6$ (per)fluorooxyalkyl group having one or more ether groups, e.g. $-C_2F_5-O-CF_3$;

(vii) functional (per)fluorooxyalkylvinylethers of formula $CF_2{=}CFOY_0$, wherein $Y_0$ is selected from a $C_1$-$C_{12}$ alkyl group or (per)fluoroalkyl group, a $C_1$-$C_{12}$ oxyalkyl group and a $C_1$-$C_{12}$ (per)fluorooxyalkyl group having one or more ether groups, $Y_0$ comprising a carboxylic or sulfonic acid group, in its acid, acid halide or salt form;

(viii) fluorodioxoles, especially perfluorodioxoles;

(ix) vinyl fluoride, and their mixtures.

Most preferred fluorinated comonomers are chlorotrifluoroethylene (CTFE), trifluoroethylene (TrFE), tetrafluoroethylene (TFE), hexafluoropropylene (HFP), perfluoromethylvinylether (PMVE).

In one embodiment of the present invention, the polymer (VDF) preferably comprises, more preferably consists of:

recurring units derived from vinylidene fluoride, from 0.1% to 3% by moles, with respect to the total amount of moles of recurring units in said polymer (VDF), of recurring units derived from at least one (meth)acrylic monomer [monomer (MA)], and from 0.1% to 10% by moles, preferably from 0.2% to 5% by moles, with respect to the total amount of moles of recurring units in said polymer (VDF), of recurring units derived from hexafluoropropylene (HFP).

The process of the invention is a polymerization carried out in aqueous suspension.

For the purpose of the present invention, by polymerization in aqueous suspension it is meant a process wherein the reaction medium is formed by an organic phase, to which water is added in order to favor the heat dispersion developing during the reaction. The organic phase can be formed by the monomer(s) themselves, without addition of solvents, or by the monomer(s) dissolved in a suitable organic solvent, in the presence of a suitable organic initiator and of a water soluble suspending agent having repeating molecular units in the structure.

The polymerization reaction can be carried out in conditions of temperature and pressure such that the more abundant monomer, namely VDF, is present in subcritical or supercritical conditions.

The process of the invention is carried out at temperatures of typically at least 10° C., preferably of at least 25° C., more preferably of at least 45° C.

The pressure is typically maintained at a value of more than 25 bar, preferably of more than 50 bar, even more preferably of more than 75 bar.

For the purpose of the present invention, the term "non-ionic suspending agent" is intended to denote a polymer containing hydroxyl groups selected from the group consisting of:

a) polysaccharide derivatives;

b) partially hydrolysed polyvinylalcohol (PVAs); and c) alkylene oxide polymers (PAOs).

The term "polysaccharide derivative" is hereby intended to indicate a non-ionic derivative of a polysaccharide polymer containing hydroxyl groups comprising as recurring units one or more glycosidic units linked to each other by glycosidic bonds. Glycosidic units are hereby intended to denote either six-membered pyranoside rings or five-membered furanoside rings.

Preferably, the non-ionic polysaccharide derivative comprises recurring glycosidic units selected from D-glucopyranosides and glucofuranosides, or a mixture thereof, linked to each other by glycosidic bonds.

More preferably, in the process of the present invention the non-ionic polysaccharide derivative a) is a carbohydrate comprising recurring β-D-glucopyranosides units of formula (I), linked to each other by β-glycosidic bonds:

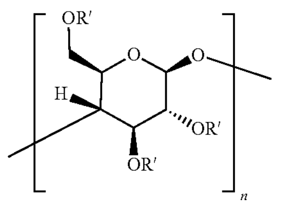

wherein each R', equal to or different from any other at each occurrence, represents a hydrogen atom, a $C_1$-$C_8$ hydrocarbon group or a $C_2$-$C_8$ hydroxyalkyl group.

More preferably, in the carbohydrate derivative of formula (I), each R', equal to or different from any other, represents a hydrogen atom, a hydroxyethyl group or a 2-hydroxypropyl group.

More preferably, in the process of the invention the carbohydrate derivative of formula (I) is hydroxyethyl methylcellulose or 2-hydroxypropyl methylcellulose, the latter being particularly preferable.

Non-limitative examples of non-ionic polysaccharide derivatives a) suitable for the process of the invention include, notably, cellulose derivatives available under the trademark names METHOCEL™ K100, having a dynamic viscosity of 80-120 mPa·s at 20° C. in an aqueous solution at a concentration of 2% by weight, METHOCEL™ K15M, having a dynamic viscosity of 11,250-21,000 mPa·s at 20° C. in an aqueous solution at a concentration of 2% by weight, METHOCEL™ K3, having a dynamic viscosity of 2.4 to 3.6 mPa·s at 20° C. in an aqueous solution at a concentration of 2% by weight, METHOCEL™ K4M, having a dynamic viscosity of 3000 to 6000 mPa·s at 20° C. in an aqueous solution at a concentration of 2% by weight and CULMINAL® MHPC5 having a dynamic viscosity of 4 to 8 mPaxs at 20° C. in an aqueous solution at a concentration of 2% by weight.

Partially hydrolysed polyvinyl alcohol b) is hereby intended as an aqueous composition including partially hydrolysed polyvinyl acetate and polyvinyl alcohol.

Polyvinyl alcohols are commercially available and may be obtained over a range of molecular weights and degree of hydrolysis.

Generally, a polyvinyl alcohol is prepared by hydrolysis of a polyvinyl alcohol precursor (polyvinyl acetate) obtained from polymerization of vinyl acetate ($CH_3COOCHCH_2$), as shown in Scheme I below, Scheme 1

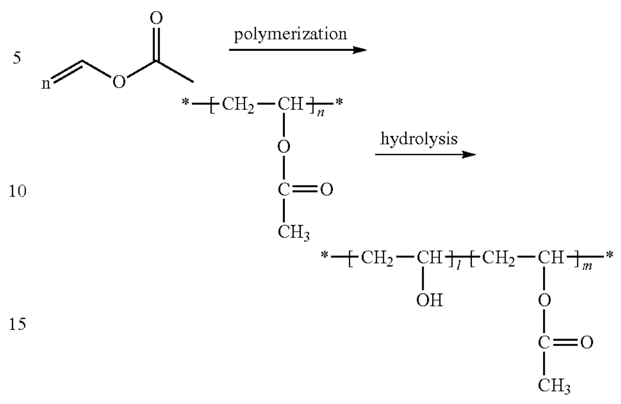

and the degree of saponification is defined as a degree of hydrolysis (degree of saponification=I/(I+m)).

The degree of hydrolysis of the PVA used in the aqueous composition of the present invention is preferably of at least 80%.

By the term "alkylene oxide polymer (PAO)" it is hereby intended a water-soluble non-ionic suspending agent homopolymer or copolymer consisting essentially of recurring units derived from linear alkylene oxide(s).

Alkylene oxide homo- or co-polymers that are suitable for being used in the present invention are typically, but not exclusively, selected from homopolymers consisting of recurring units derived from ethylene oxide (EO), such as polyethylene glycols (also indicated as PEGs, POEs or PEOs).

Typically, the average molecular weight ($M_w$) of the alkylene oxide polymers in the context of the present invention ranges from 50,000 to g/mol as measured by the techniques known to the person skilled in the art, such as by determination of the viscosity of their solution in water.

According to preferred embodiments, the alkylene oxide polymer (PAO) is a polyethylene oxide having formula (II):

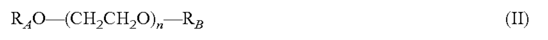

$$R_AO—(CH_2CH_2O)_n—R_B \quad (II)$$

wherein $R_A$ and $R_B$ are, independently from each other, H or a $C_1$-$C_5$ alkyl, preferably H or $CH_3$, n is an integer from 1000 to 200000, preferably from 2000 to 100000, more preferably from 5000 to 70000.

Still, according to more preferred embodiments, the alkylene oxide polymer (PAO) is a polyethylene glycol having formula (IIb):

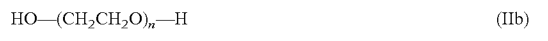

$$HO—(CH_2CH_2O)_n—H \quad (IIb)$$

wherein n is an integer from 1000 to 200000, preferably from 2000 to 100000, more preferably from 5000 to 70000.

The at least one ionic carboxyalkyl cellulose B) is a cellulose derivative of formula $[C_6—H_7—O_5—R_3]_n$ where R is either H or a carboxyalkyl salt, preferably a caboxymethyl salt of formula $—CH_2—COO\text{-}M^+$, where M is a monovalent cation selected from ammonium or alkali metals cations, preferably from $Na^+$ and $Li^+$, and n is an integer from 100 to 5000.

The at least a non-ionic suspending agent A) is typically present in the polymerization reaction mixture in an amount of from 0.01 to 2 g per kg of VDF monomer, preferably of from 0.05 to 0.55 g per kg of VDF monomer, more preferably of from 0.05 to 0.3 g per kg of VDF monomer.

The at least one ionic carboxyalkyl cellulose B) is typically present in the polymerization reaction mixture in an amount of from 0.05 to 10 g per kg of VDF monomer, preferably of from 0.3 to 5 g per kg of VDF monomer, more preferably from 0.5 to 5 g per kg of VDF monomer.

In preferred embodiments according to the present invention, the process is carried out in the presence of A) at least a non-ionic suspending agent and B) at least an ionic carboxyalkyl cellulose, wherein the amount of the at least an ionic carboxyalkyl cellulose B) is higher than that of the non-ionic suspending agent A).

More preferably, the amount of the at least one ionic carboxyalkyl cellulose B) in polymerization is higher than 0.5 g per kg of VDF monomer and the amount of the at least one non-ionic suspending agent A) is lower than 0.3 g per kg of VDF monomer.

The process of the invention is typically carried out in an aqueous suspension medium in the presence of a radical initiator. While the choice of the radical initiator is not particularly limited, it is understood that those initiators suitable for the process according to the invention are selected from compounds capable of initiating and/or accelerating the polymerization process.

Among radical initiators that may advantageously be used in the process of the invention, mention can be made of organic radical initiators. Non-limiting examples of suitable organic radical initiators include, but are not limited to, the following: acetylcyclohexanesulfonyl peroxide; diacetyl peroxydicarbonate; dialkylperoxydicarbonates such as diethylperoxydicarbonate, dicyclohexylperoxydicarbonate, di-2-ethylhexyl peroxydicarbonate; tert-butylperneodecanoate; 2,2'-azobis(4-methoxy-2,4dimethylvaleronitrile; tert-butylperpivalate; tert-amylperpivalate; dioctanoylperoxide; dilauroyl-peroxide; 2,2'-azobis(2,4-dimethylvaleronitrile); tert-butylazo-2-cyanobutane; dibenzoylperoxide; tert-butyl-per-2ethylhexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis(tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

The VDF polymer of the invention has an intrinsic viscosity of from 0.05 to 0.75 l/g, preferably of from 0.10 to 0.55 l/g, more preferably of from 0.13 to 0.45 l/g, as measured at 25° C. in N,N-dimethylformamide.

The Applicant has surprisingly found that the process according to the present invention allows obtaining a polymer (VDF) in the form of particles characterized by an excellent flowability, which is a very important feature in industrial processes, where high amounts of VDF polymers in the form of powder have to be manipulated.

Thus, in a second aspect, the present invention pertains to a vinylidene fluoride polymer [polymer (VDF)] obtainable by the process of the invention.

In particular, the polymer (VDF) obtained by the process of the invention is characterized by having a size distribution with a D50 value higher than 150 microns and a very narrow particle size distribution (PSD).

In addition, the polymer powder obtained by the process of the present invention is characterized by having bead-shaped, substantially round particles.

The processes of the prior art allow obtaining particles having a size distribution with a D50 value higher than 150 microns only by a process that includes preparing pellets of the polymer and then milling said pellets to obtain the required particle size. However, the shape of said milled particles is not round and the surface of said particles is not smooth; consequently, no advantages in terms of flowability are obtained by said particles.

Figure 2:
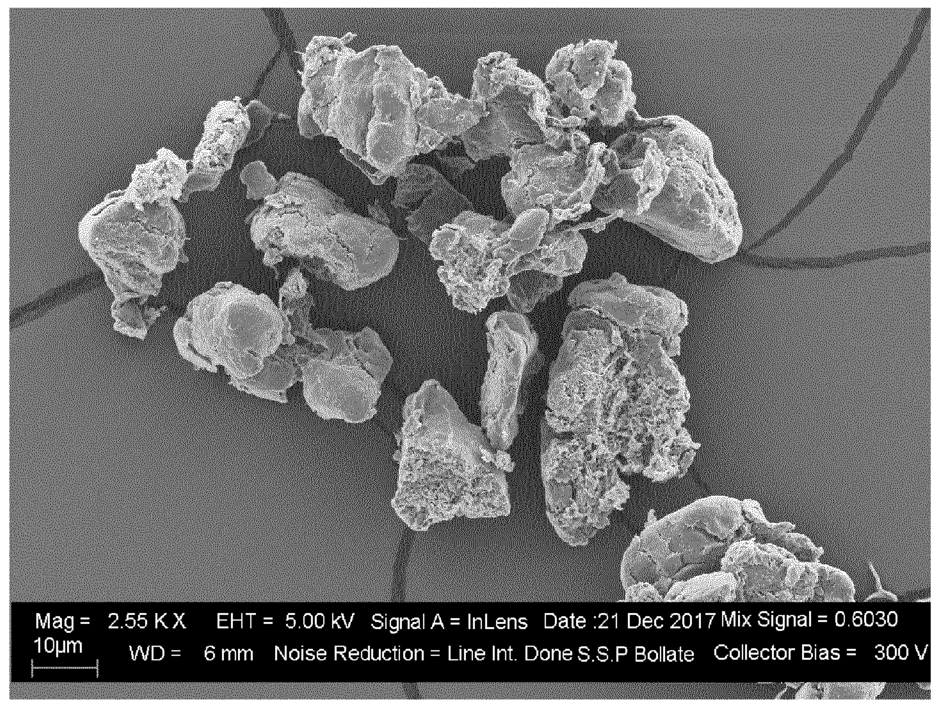
FIG. 2 shows the SEM image of the particles of a PVDF polymer manufactured according to a standard process in the form of pellets and subsequently milled to reduce the particle size. Magnification of 2.55 K×.

The process of the present invention allows obtaining bead-shaped, substantially round particles having a size distribution with a D50 value higher than 150 microns which are clearly different from those obtained by milling the pellets according to processes of the prior art, as shown in FIGS. 1 and 2.

A particularly preferred embodiment of this invention pertains to a polymer (VDF) comprising more than 50% moles, preferably more than 80% moles, of recurring units derived from the polymerization of vinylidene fluoride monomer, said polymer (VDF) being characterized by having a size distribution with a D50 value higher than 250 microns.

In a third aspect, the present invention pertains to a composition [composition (C)] comprising at least one polymer (VDF) of the invention.

The composition (C) of the invention may further comprise one or more additives.

Non-limiting examples of suitable additives include, for instance, plasticizers such as dibutyl sebacate.

In a fourth aspect, the present invention pertains to an article comprising the polymer (VDF) or the composition (C) as defined above.

The article of the invention is typically obtainable by processing the polymer (VDF) or the composition (C) as defined above using melt processing techniques such as injection or compression moulding.

The article of the invention is particularly suitable for use in various applications such as battery applications.

In particular, suitable articles comprising the polymer (VDF) or the composition (C) as defined above are components for secondary batteries such as electrodes and/or separators for secondary batteries, especially in Lithium-ion batteries.

The polymer (VDF) of the invention, or the composition (C) as above defined, is particularly suitable as binder in electrodes for secondary batteries, especially Lithium-ion batteries.

Also, the polymer (VDF) of the invention, or the composition (C) as above defined, is particularly suitable for use in separators for secondary batteries, especially Lithium-ion batteries, such as composite separators comprising:

- at least one substrate layer comprising, preferably consisting of at least one polyolefin, and
- adhered to said substrate layer, at least one layer comprising, preferably consisting of, at least one polymer (VDF) of the invention.

Still, another object of the invention is the use of the the polymer (VDF) or the composition (C) as defined above for the manufacture of a hydrophilic membrane.

The present invention thus pertains to a process for the manufacture of a hydrophilic membrane comprising polymer (VDF) or composition (C), and to the hydrophilic membrane comprising polymer (VDF) or composition (C) as defined above.

The above detailed use for the manufacture of hydrophilic membrane, process and membrane therefrom will be described in detail in relation with polymer (VDF); it is nevertheless understood that the composition (C) as above detailed can be used in lieu of polymer (VDF) in all the embodiments detailed here below.

To the purpose of the invention, the term "membrane" possesses its usual meaning, that is to say it refers, in essence, to a discrete, generally thin, interface that moderates the permeation of chemical species in contact with it.

This interface may be molecularly homogeneous, that is, completely uniform in structure (dense membrane), or it may be chemically or physically heterogeneous, for example containing voids, holes or pores of finite dimensions (porous membrane). The terms "pore", "void" and "hole" will be used as synonymous within the context of the present invention.

The membrane of the invention is preferably a porous membrane. A porous membrane possesses generally a voided structure with interconnected pores.

Porous membranes are generally characterized by the average pore diameter (d) and the porosity (c), i.e. the fraction of the total membrane that is porous.

The porous membrane of the invention has a porosity (c) of advantageously at least 1%, preferably of at least 2%, more preferably of at least 3% and advantageously of at most 90%, preferably of at most 80%. These pores have generally an average diameter (d) of advantageously at least 0.01 μm, preferably of at least 0.05 μm, more preferably of at least 0.1 μm and advantageously of at most 50 μm, preferably of at most 25 μm, more preferably of at most 10 μm.

The membrane can be under the form of a flat-sheet or can be produced under the form of thin tubes or fibers (hollow-fiber membranes). Flat-sheet membranes are generally preferred when high fluxes are required. Formation of membrane into hollow fibers is particularly advantageous when compact modules with high surface areas are required.

The membranes of the invention can be used in the chemical processing industry in various separation processes, such as microfiltration and preferably ultrafiltration, in particular of aqueous media, in biomedical applications, e.g. for haemodialysis, for controlled release of drugs, for artificial organs, such as kidney, lung and pancreas, and in membrane bioreactors for municipal and industrial wastewater treatments.

Should the membrane be a dense membrane, the process of the invention advantageously comprises casting and/or melt forming the polymer (VDF) as defined above. Melt forming is commonly used to make dense membranes either by extrusion as a sheet from a die or as a blown film.

Should the membrane be a porous membrane, the process of the invention advantageously comprises at least one step including one of irradiation technique, film expansion, template leaching technique, solution precipitation technique, electrospinning technique.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials (B-1): sodium carboxymethylcellulose of average molecular weight 250,000 g/mol, commercially available from Sigma Aldrich.

(B-2): sodium carboxymethylcellulose of average molecular weight 90,000 g/mol, commercially available from Sigma Aldrich.

(A-1): hydroxypropyl methylcellulose ether, commercialized by Dow Chemical under the name Methocel® K100GR, having a dynamic viscosity of 80-120 mPa·s at 20° C. in an aqueous solution at a concentration of 2% by weight.

(A-2): PVA commercially available under the name Alcotex® 80 (Synthomer), 80% hydrolysed high molecular weight polyvinyl alcohol.

DCE: Diethyl Carbonate from Sigma Aldrich.

Determination of Intrinsic Viscosity of Polymer

Intrinsic viscosity (η) [dl/g] was measured using the following equation on the basis of dropping time, at 25° C., of a solution obtained by dissolving the polymer in N,N-dimethylformamide at a concentration of about 0.2 g/dl using a Ubbelhode viscosimeter:

$$[\eta] = \frac{\eta_{sp} + \Gamma \cdot \ln\eta_r}{(1 + \Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r-1$, and Γ is an experimental factor, which for polymer (VDF) corresponds to 3.

Example 1

In a 4 L reactor equipped with an impeller running at a speed of 650 rpm were introduced in sequence: 1,950 g of demineralized water and 0.08 g of (A-1) per kg of total VDF monomers and 0.93 g of (B-1) per kg of total VDF monomers and 371.5 g of a solution of calcium hydroxide, from Sigma Aldrich.

The oxygen present in the reactor was removed with a sequence of vacuum and purge of nitrogen at a fixed temperature of 14° C. This sequence was repeated 3 times.

Then, 40 g of demineralized water, 5.1 g of hydrogen peroxide (from Brenntag), 15.27 g of DCE and 1.59 g of ethyl chloroformiate (from Framochem) were introduced in the reactor.

After 15 minutes, 1,004 g of VDF were added to the mixture at a stirring speed of 880 rpm. The reactor was then gradually heated until the first set-point temperature of 41.5° C. was reached, corresponding to a pressure of the reactor of 83 bars. The pressure was kept constantly equal to 83 bars run by feeding 295 g of VDF. After this feeding, no more monomer was fed and the pressure started to decrease down to 57 bar. Then, the reactor was gradually heated at 61° C. At this point, the pressure started to decrease. When the pressure was decreased down to 20 bars, the reaction was stopped by degassing the suspension until reaching atmospheric pressure. A total of 1,300 g of VDF were charged in the reactor. The polymer was then collected by filtration and suspended against clean water in a stirred tank. After the washing treatment, the polymer was dried in a fluidized bed dryer (Retsch) at 60° C. for three hours. 1,236 g of dry powder were collected.

In general a conversion higher than 90% of VDF was achieved in all working embodiments.

Polymerization time, particle characterization and flowability are shown in Table 1.

Example 2 Comparative

The same procedure of Example 1 was followed, but adding only 0.46 g of (A-1) per kg of total VDF monomers and no (B-1) in the reactor.

1,249 g of dry powder were collected.

Polymerization time, particle characterization and flowability are shown in Table 1.

Example 3

The same procedure of Example 1 was followed, but using 0.08 of (A-1)

per kg of total VDF monomers and 0.46 g of (B-1) per kg of total VDF monomers.

Polymerization time, particle characterization and flowability are shown in

Table 1.

Example 4 Comparative

The same procedure of Example 1 was followed, but adding only 0.09 g of (A-1) per kg of total VDF monomers and no (B-1) in the reactor.

The suspension was found to be highly instable and the reactor had to be degassed after 67 minutes. Not valid polymerization. This prevents the scaling of the process to industrial production.

Polymerization time, particle characterization and flowability are shown in Table 1

Example 5 Comparative

The same procedure of Example 1 was followed, but adding only 1.19 of (B-1) per kg of total VDF monomers and no (A-1).

The suspension was found to be highly instable and the reactor had to be degassed after 114 minutes. Not valid polymerization. This prevents the scaling of the process to industrial production.

Polymerization time, particle characterization and flowability are shown in Table 1.

Example 6

The same procedure of Example 1 was followed, but adding 0.08 g of (A-1) per kg of initial VDF monomers and 0.93 g of (B-2) per kg of total VDF monomers.

Polymerization time, particle characterization and flowability are shown in Table 1.

Example 7

In a 4 L reactor were introduced in sequence 2,239 g of demineralized water and 0.07 g of (A-1) per kg of total VDF monomers and 0.80 g of (B-1) per kg of total VDF monomers. The mixture was stirred with an impeller running at a speed of 880 rpm.

The oxygen present in the reactor was removed with a sequence of vacuum and purged of nitrogen at a fixed temperature of 14° C. This sequence was repeated 3 times.

Then, 20 g of DCE and 1.47 g of a solution of the initiator t-amylperpivalate (from United Initiators) in isododecane (75%) were introduced in the reactor.

1,053 g of VDF were added to the mixture. The reactor was then gradually heated until the first set point temperature of 52° C. was reached. At this temperature, the pressure of the reactor was fixed at 120 bars.

The pressure was kept constantly equal to 120 bars by feeding 244 g of VDF. After this feeding, no more monomer was fed and the pressure started to decrease down to 90 bar. Then, the reactor was gradually heated at 67° C. The pressure was kept at 80 bars and 281 g of VDF were fed to the reactor. The pressure then was decreased to 55 bar and the polymerization was stopped by degassing the suspension until reaching atmospheric pressure. A total of 1,580 g of VDF were charged in the reactor. The polymer was then collected by filtration and suspended against clean water in a stirred tank. After the washing treatment, the polymer was dried in a fluidized bed dryer (Retsch) at 60° C. for three hours.

1,414 g of dry powder were collected.

Polymerization time, particle characterization and flowability are shown in Table 1.

Example 8

In a 4 L reactor were introduced in sequence 2,542 g of demineralized water and 0.06 g of (A-1) per kg of total VDF monomers and 0.68 g of (B-1) per kg of total VDF monomers. The mixture was stirred with an impeller running at a speed of 880 rpm.

The oxygen present in the reactor was removed with a sequence of vacuum and purged of nitrogen at a fixed temperature of 14° C. This sequence was repeated 3 times.

Then, 9.5 g of DCE and 1.33 g of a solution of the initiator t-amylperpivalate (from United Initiators) in isododecane (75%) were introduced in the reactor.

820 g of VDF were added to the mixture. The reactor was then gradually heated until the first set point temperature of 52° C. was reached. At this temperature, the pressure of the reactor was fixed at 120 bars.

The pressure was kept constantly equal to 120 bars by feeding in total 631 g of VDF during the polymerization. After this feeding, no more monomer was fed and the pressure started to decrease down to 95 bar. Then, the reactor was gradually heated at 65° C. At this point, the pressure started to decrease. When the pressure was decreased down to 46 bars, the reaction was stopped by degassing the suspension until reaching atmospheric pressure. A total of 1,450 g of VDF were charged in the reactor. The polymer was then collected by filtration and suspended against clean water in a stirred tank. After the washing treatment, the polymer was dried in a fluidized bed dryer (Retsch) at 60° C. for three hours 1,288 g of dry powder were collected.

Polymerization time, particle characterization and flowability are shown in Table 1.

Example 9

In a 4 L reactor were introduced in sequence 1,714 g of demineralized water and 0.1 g of (A-1) per kg of total monomers and 1.2 g of (B-1) per kg of total monomers. The mixture was stirred with an impeller running at a speed of 880 rpm.

The oxygen present in the reactor was removed with a sequence of vacuum and purged of nitrogen at a fixed temperature of 14° C. This sequence was repeated 3 times.

Then, 0.55 g of acrylic acid (AA) and 4.94 g of a solution of the initiator t-amylperpivalate (from United Initiators) in isododecane (75%) were introduced in the reactor. Immediately after, 1,279 g of VDF were added to the mixture. The reactor was then gradually heated until the set point temperature of 55° C. was reached, corresponding to a pressure of 120 bars.

The pressure was kept constantly equal to 120 bars during the whole polymerization run by feeding an aqueous solution comprising 14.91 g of AA per liter of solution. After 405 minutes the polymerization was stopped by degassing the suspension until reaching atmospheric pressure. A total of 909 g of the AA solution was charged to the reactor.

The polymer was then collected by filtration and suspended against clean water in a stirred tank. After the washing treatment, the polymer was dried in a fluidized bed dryer (Retsch) at 60° C. for three hours. 974 g of dry powder were collected.

Polymerization time, particle characterization and flowability are shown in Table 1.

Flowability Test:

The flowability of the dry powders obtained in examples 1 to 10 was assessed according to the ASTM D 1895 norm for powders.

50 g of dry polymer powder was weighted on a precision scale. Then the powder was manually shaken, in a stainless steel cylindrical container of dimensions (3.99×7.98 cm) for five minutes. The resulting powder was then placed in a closed Inox funnel (with the dimensions of 11.4 cm where the opening diameter is of 9.3 cm), placed at 12 cm high of a receiving cup. The powder was then released and the time needed for the powder to flow was monitored with a stopwatch. When the powder was not flowing well, the funnel was tapped until complete flow of the sample. The powder collected on the cup was weighted again on a precision scale. The time and the quantity of flown powder were collected, as well as its aspect and the need or not to help the powder flow.

D50: the particle size analysis of the powder was carried out using laser diffraction according to the ISO 13320 norm. D50 designates the particle diameter where half the population lies below this value and half lies above.

The particle size distribution (PSD) of the population was evaluated measuring the SPAN.

The SPAN was calculated according to:

$$SPAN = \frac{D_{90} - D_{10}}{D_{50}}$$

where D90 is the diameter where 90% of the population lies below this value and D10 is the diameter where 10% of the population lies below this value.

The results are shown in Table 1 here below.

TABLE 1

| Example | T [h:min] | Particle size (D50) [μm] | Particle size distribution (span) | Flowability (50 g, 5 minutes of manual shaking) [sec] |
|---|---|---|---|---|
| 1 | 5:59 | 267 | 1.04 | 15 |
| 2 Comp. | 6:02 | 102 | 0.71 | 82 |
| 3 | 5:30 | 270 | 1.21 | — |
| 4 Comp. | 1:06 | N.A. (fouling in the reactor) | | |
| 5 Comp. | 1:54 | N.A. (fouling in the reactor) | | |
| 6 | 5:24 | 279 | 0.97 | 12 |
| 7 | 5:46 | 208 | 0.81 | — |
| 8 | 6:31 | 220 | 0.83 | — |
| 9 | 5:47 | 162 | 1.04 | — |

As shown in Table 1, it has been found that the process of the invention advantageously enables obtaining VDF polymers as notably embodied by the polymers obtained according to the process of any one of Examples 1, 3 and 6 to 9 exhibiting large polymer particles and at the same time a narrow PSD.

In particular, VDF polymers of examples 1 and 6 having a particularly high particle size higher than 250 μm show an excellent flowability. On the other side, the processes for manufacturing the polymers of Comparative Examples 2, 4 and 5, wherein either only the non-ionic or the ionic suspending agent was used, led to a dry polymer of lower particle size or to a polymerization that was not controllable because of the absence of a stable suspension leading to the formation of blocks of polymer in the reactor.

The invention claimed is:

1. A vinylidene fluoride polymer comprising more than 50% moles of recurring units derived from the polymerization of vinylidene fluoride monomer, said polymer (VDF) being characterized by having a size distribution with a D50 value higher than 250 microns.

2. The vinylidene fluoride polymer of claim 1, wherein the flowability of the polymer (VDF) is less than 50 seconds per 50 g with 5 minutes of manual shaking according to ASTM D 1895.

3. A composition comprising at least one polymer (VDF) according to claim 1.

4. An article comprising the at least one polymer (VDF) according to the composition (C) according to claim 3.

5. The article according to claim 4 that is a component for secondary batteries.

6. The article according to claim 4 that is a hydrophilic membrane.

7. A process for manufacturing a vinylidene fluoride polymer in aqueous suspension, said process comprising polymerizing vinylidene fluoride monomer (VDF monomer) from a polymerization reaction mixture comprising:

A) at least a non-ionic suspending agent present in the polymerization reaction mixture in an amount of from 0.01 to 2 g per kg of VDF monomer; and B) at least an ionic carboxyalkyl cellulose.

8. The process according to claim 7, wherein the non-ionic suspending agent is a polymer containing hydroxyl groups selected from the group consisting of:

a) polysaccharide derivatives;

b) partially hydrolysed polyvinylalcohol (PVAs); and c) alkylene oxide polymers (PAOs).

9. The process according to claim 8, wherein the polysaccharide derivative is a carbohydrate comprising recurring β-D-glucopyranosides units of formula (I), linked to each other by β-glycosidic bonds:

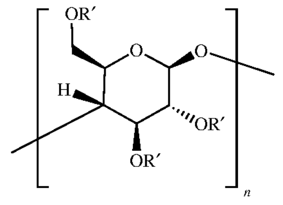

wherein each R', equal to or different from any other at each occurrence, represents a hydrogen atom, a $C_1$-$C_8$ hydrocarbon group or a $C_2$-$C_8$ hydroxyalkyl group.

10. The process according to claim 9, wherein the carbohydrate comprising recurring β-D-glucopyranosides units of formula (I) is hydroxyethyl methylcellulose or 2-hydroxypropyl methylcellulose.

11. The process according to claim 8, wherein the partially hydrolysed polyvinylalcohol (PVA) is as an aqueous composition of partially hydrolyzed polyvinyl acetate and polyvinyl alcohol having a degree of hydrolysis of at least 80%.

12. The process according to claim 8, wherein the alkylene oxide polymer (PAO) is a polyethylene glycol having formula (IIb):

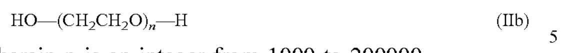

$$HO—(CH_2CH_2O)_n—H \quad \text{(IIb)}$$

wherein n is an integer from 1000 to 200000.

13. The process according to claim 7, wherein the ionic carboxyalkyl cellulose B) is present in the polymerization reaction mixture in an amount of from 0.05 to 10 g per kg of VDF monomer.

14. The process according to claim 7, wherein the amount of the at least an ionic carboxyalkyl cellulose B) is higher than that of the non-ionic suspending agent A).

15. The process according to claim 7, wherein the amount of the at least one ionic carboxyalkyl cellulose B) in the polymerization reaction mixture is higher than 0.5 g per kg of VDF monomer and the amount of the at least one non-ionic suspending agent A) is lower than 0.3 g per kg of VDF monomer.

16. A vinylidene fluoride polymer obtained by the process according to claim 7, wherein the flowability of the polymer (VDF) is less than 50 seconds per 50 g with 5 minutes of manual shaking according to ASTM D 1895.

* * * * *